Oct. 13, 1925.

C. W. WYMAN

ELECTRICAL CONTROLLER

Filed July 22, 1918     4 Sheets-Sheet 1

Inventor:
Charles W. Wyman,
by

Oct. 13, 1925.

C. W. WYMAN

ELECTRICAL CONTROLLER

Filed July 22, 1918

Inventor:
Charles W. Wyman.
by

Oct. 13, 1925.

C. W. WYMAN

ELECTRICAL CONTROLLER

Filed July 22, 1918       4 Sheets-Sheet 3

1,556,826

Inventor:
Charles W. Wyman
by
Atty.

Oct. 13, 1925.

C. W. WYMAN

ELECTRICAL CONTROLLER

Filed July 22, 1918

Inventor:
Charles W. Wyman.
by
Atty.

Patented Oct. 13, 1925.

1,556,826

UNITED STATES PATENT OFFICE.

CHARLES W. WYMAN, OF CLAREMONT, NEW HAMPSHIRE, ASSIGNOR TO SULLIVAN MACHINERY CORPORATION, A CORPORATION OF MASSACHUSETTS.

ELECTRICAL CONTROLLER.

Application filed July 22, 1918. Serial No. 246,219.

*To all whom it may concern:*

Be it known that I, CHARLES W. WYMAN, a citizen of the United States, residing at Claremont, in the county of Sullivan and State of New Hampshire, have invented certain new and useful Improvements in Electrical Controllers, of which the following is a full, clear, and exact specification.

This invention relates to electrical controllers, and more particularly, although not exclusively, to controllers for alternating current motors employed in mining and other machines.

The invention has for one object the provision of an apparatus of this character comprising a main circuit controller and a reversing switch, and having improved means for locking the reversing switch against operation except when the main controller is in its "off" position, i. e., in a position to break the circuit, said means preferably also operating to lock said main controller in the latter position except when the reversing switch is in one or the other of its extreme or circuit closing positions.

Another object of the invention is the provision of an apparatus of the character referred to employing a controller member movable in different directions from its "off" position for the purpose of closing different circuits, or producing different connections, said apparatus comprising means for compelling the movement of said controller in the several directions respectively in a predetermined sequence. For example, if the controller be employed in connection with a three-phase motor, and be movable in opposite directions for the purpose of connecting said motor in star and in delta, respectively, means may be provided whereby said controller must be operated to produce the star connection before the same can be moved into position for connecting the motor in delta, as is desirable in starting the motor, said means preferably also acting to compel a quick movement of the controller from the star to the delta position without any appreciable dwell in the "off" position.

Another object of the invention is the provision of means for automatically locking the controller in the "off" position when moved thereinto, said locking means being manually releasable, but requiring a deliberate operation in order to release the same, thereby preventing the accidental or unintentional operation of the controller to close the circuit.

A further object of the invention is the provision of an apparatus of the character referred to, and comprising a main controller and a reversing switch, which is of exceedingly compact construction and arrangement, requiring a minimum amount of space for its accommodation in the machine in connection with which it is used, and therefore especially adapted to mining and similar machines in which economy of space is an important consideration.

A still further object of the invention is the provision of an improved reversing switch in which the contact elements are so enclosed as to reduce the effects of arcing to a minimum, and of such construction as to insure a close engagement between the several cooperating contact elements irrespective of any irregularities of the parts caused by wear or otherwise.

The foregoing and other objects of the invention, together with means whereby the same may be carried into effect, will best be understood from the following description of one form or embodiment thereof illustrated in the accompanying drawings. In said drawings.

Figure 1:
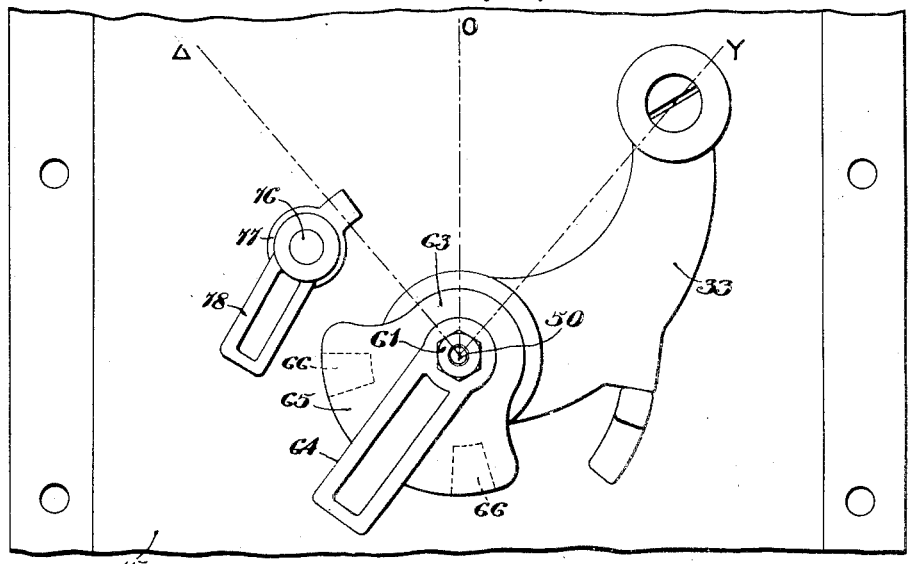
Fig. 1 is a front elevation showing the controller handle in the starting or first circuit closing position.
Figure 5:
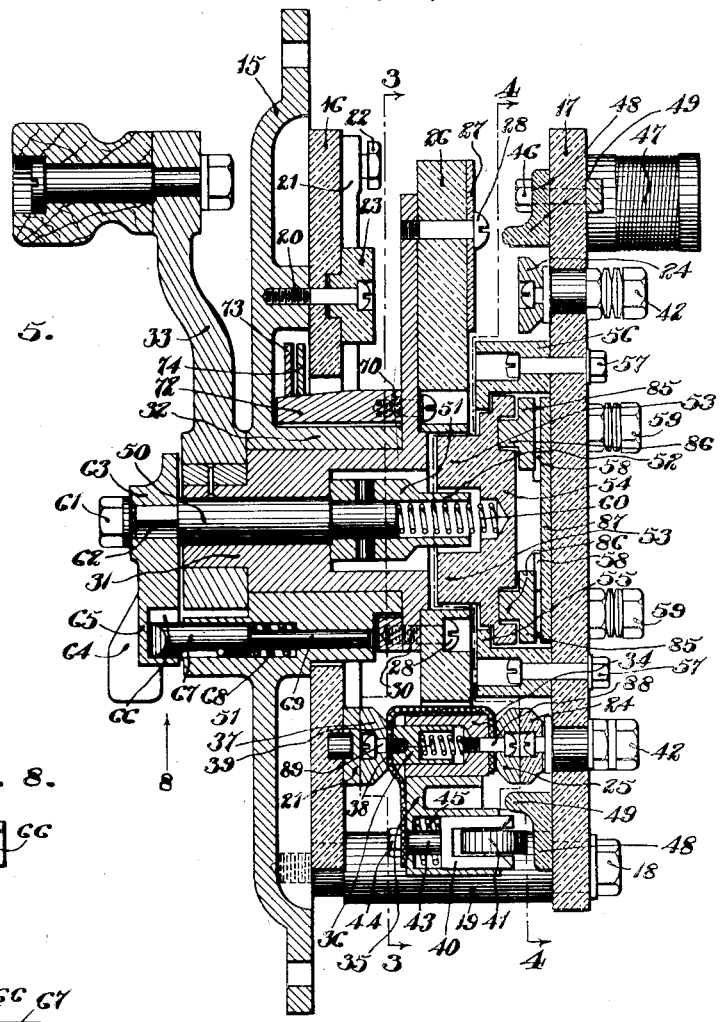
Fig. 5 is a transverse vertical section, substantially on the line 5—5, Fig. 4, of the complete apparatus, showing the main controller handle in the "off" position.
Figure 15:
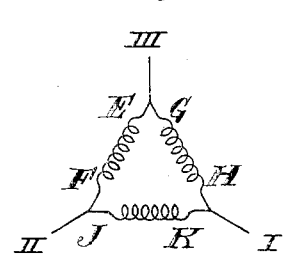

Referring to Figs. 1 and 5, 15 denotes a portion, preferably a cover plate, of a casing containing a frame comprising front and rear plates 16 and 17, preferably of wood, though other insulating material may be used, secured to and spaced from one another by means of bolts 18 and spacing sleeves 19, respectively, said bolts 18 serving also to secure said frame to the casing or cover plate 15.

Figure 2:
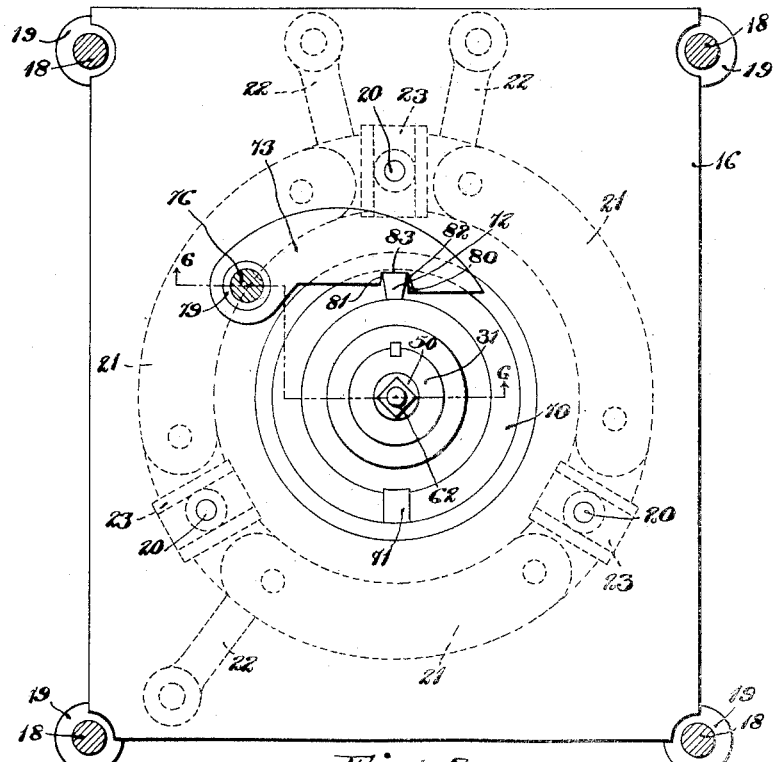
Fig. 2 is a similar view with the front cover or casing plate and the several operating handles removed, certain parts being shown in section on the line 2—2, Fig. 6, and the controller being shown as in the "off" position.

Secured to the frame plate 16, as by means of machine screws 20 and cleats or clamps 23 of insulating material, are a plurality of segmental contact plates 21 each provided with a line terminal 22, the cleats 23 being interposed between the ends of the plates 21, and the several plates, together with the cleats, collectively forming a complete circle (see Fig. 2). The invention as herein illustrated is embodied in a controller for a three-phase motor, and three contact plates 21 are accordingly shown, although any suitable number may be employed in accordance with the requirements.

Figure 3:
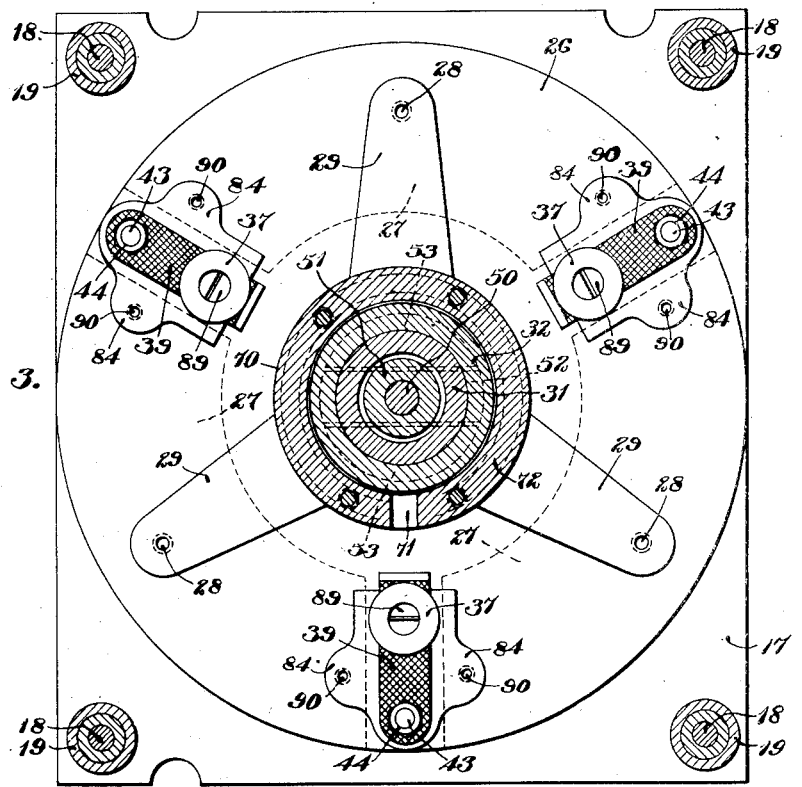
Fig. 3 is a section on the line 3—3, Fig. 5.
Figure 4:
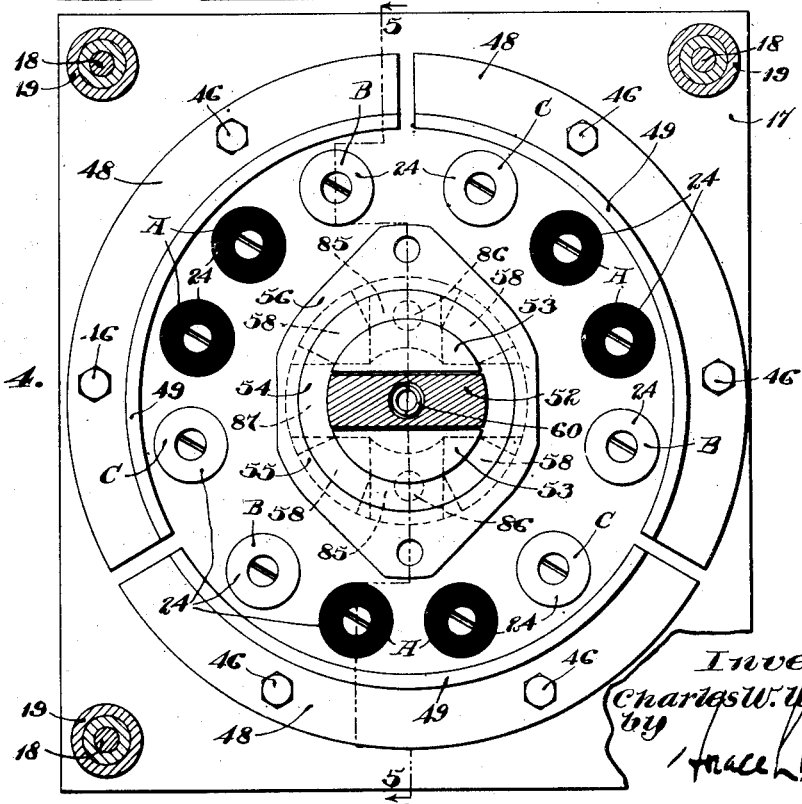
Fig. 4 is a section on the line 4—4, Fig. 5.

Carried by the frame plate 17 is a plurality of sets of contact members or buttons 24, the number of sets corresponding to the number of contact plates 21, and being herein shown as three (see Fig. 4). Cooperating with the contact members 24 of each set, is a brush 25 (Fig. 5) carried, as hereinafter more fully described, by a disc of insulating material, preferably wood, or annulus 26 secured, by means of machine screws 28, to radial arms 29 (Fig. 3) extending from a flange 30 on a hollow hub or shaft 31 (Fig. 5) journaled in a suitable boss 32 formed on the casing plate 15, said shaft 31 having keyed or otherwise secured to its outer end a main controller handle or lever 33. In order to protect the disk 26 against injury from arcing within the apparatus, said disk is preferably faced with a non-combustible insulating material, such as asbestos, in the form of segments 27 secured to said disk by the machine screws 28.

Each of the brushes 25 is secured, as by a screw 88, to a slide 34 guided in a block 35 having ears 84 (Fig. 3) through which it is attached, as by screws 90, to the disk or annulus 26. Within each of the slides 34 is guided a second slide 36 having secured thereto, as by a screw 89, a brush 37 engaging one of the contact plates 21. The brushes 25 and 37 of each pair are pressed into engagement with the contact members 24 and contact plates 21, respectively, by means of a spring 38 interposed between the slides 34 and 36 and located within the same, said spring tending to force the brushes 25 and 37 in opposite directions. By the foregoing connections each of the contact plates 21 may be electrically connected with one of the contact members 24 of the corresponding set.

As herein shown, four contact members or buttons 24 are included in each set, the two intermediate contacts, designated by the letter A in Fig. 4, being merely idle contacts not electrically connected in the system, and composed preferably of insulating material, while the two outermost contacts B and C of each set are provided with suitable terminals 42 (Fig. 5). The idle contacts A are preferably included in each set, in order to secure a greater separation of the contacts B and C, while preserving a suitable spacing between adjacent contacts to permit the unobstructed passage of the brush 25 thereover, although if desired one of the contacts A may be omitted, the contacts B and C being placed correspondingly nearer together, or a single contact A of greater length may be employed. In the construction shown, the contacts B are adapted, when engaged by the corresponding brush, to connect the motor in star, while the contacts C are similarly adapted to connect the motor in delta.

Guided in a suitable opening in each of the blocks 35 is a third slide 40 carrying at its end a roller 41, each of said slides having a stem 43 provided with a head 44, herein shown as a nut applied to the threaded end of said stem, for limiting the movement of said slide in the block 35. Between each of the blocks 35 and the corresponding slide 40, is interposed a spring 45 tending normally to press the roller 41 carried by said slide toward the plate 17. As the handle 33 is operated to move the brushes 25 over the contacts 24, the rollers 41 engage studs 46 carried by the plate 17, said studs corresponding in number and arrangement to the contacts B and C, and each being connected with the adjacent contact B or C through a blow-out coil 47. The studs 46 preferably extend through segmental insulating strips 48 provided with flanges 49 interposed between said studs and the contacts 24, thereby preventing arcing between the studs 46 and rollers 41, on the one hand, and the contacts 24 and brushes 25, on the other. The arrangement is such that, as the handle 33 is turned toward the "off" position from a position in which the circuit has been closed through either the contacts B or the contacts C, the roller 41 is brought into engagement with a stud 46 before the brush 25 passes out of engagement with the corresponding contact 24. The circuit between said contact and the contact plate 21 is therefore closed through the block 35, slide 40, roller 41, stud 46, and blow-out coil 47, before it is broken by separation of said contact and the brush 25, so that no arc is drawn between said brush and contact when they are separated. When the roller 41 and stud 46 are subsequently separated, the arc drawn between them is immediately extinguished by the blow-out coil 47.

The blocks 35 are preferably of metal and therefore constitute electrical connections between the slides 34, 36, and 40, brushes 25 and 37, and roller 41 of each set. In order, however, to insure the proper electrical connection of these parts, there may be employed, in connection with each block, a conductor strip 39, preferably of woven metallic fabric, secured to the slides 34 and 36, between the same and the brushes 25 and 37, by the screws 88 and 89, and to the slide 40 by the stem 43 and nut 44.

Journaled in the hollow shaft or hub 31, and arranged coaxial therewith, is a shaft 50 having pinned or otherwise secured to its inner end the hollow hub 51 of a T-shaped head 52 (see Figs. 3 and 4) which is loosely received in a recess between a pair of lugs 53 on a disk 54, said disk being rotatably mounted in a bearing formed by an inturned annular flange 55 on an insulating guard plate 56 secured to the frame plate 17, as by bolts 57. The disk 54 constitutes a reversing switch and carries on its face opposite the lugs 53 a pair of segmental contact plates 85 which engage contact members 58 secured to the plate 17 and electrically connected to suitable terminals 59. The contact plates 85 are connected with the disk 54 by means of lugs 86 which project from the rear faces of said plates and loosely engage sockets in said disk. The disk 54 is pressed toward the plate 17 and contact members 58 by means of a spring 60 interposed between said disk and the end of the shaft 50 and located within the hollow hub 51. The head 52 and lugs 53 provide a connection whereby the disk 54 is caused to rotate with the shaft 50, while being left free to move otherwise with respect to said shaft, and the contact plates 85 rotate with, but are free to rock with respect to said disk, these connections permitting said contact plates to seat firmly upon the contact members 58, under the influence of the spring 60, irrespective of any irregularities caused by wear of the parts or otherwise. The contact members 58 are separated by the arms of a cruciform insulating plate 87 which, together with the insulating guard 56 enclosing the edges of the disk 54, serve to reduce to a minimum the effect of sparking occasioned by the operation of the reversing switch.

Figure 8:
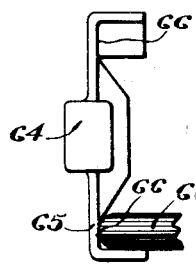
Fig. 8 is a detail view, looking in the direction of the arrow 8 on Fig. 5, of the locking segment on the reversing switch handle with the latter in a different position from that of Figs. 1 and 5.

Secured, as by a nut 61, upon the squared outer end 62 of the shaft 50, is the hub 63 of the reversing handle or lever 64, whereby the shaft 50 and reversing switch may be turned. The hub 63 is formed with a locking segment 65 provided with a pair of oppositely beveled notches 66 (see Fig. 8) which are engaged by the beveled or rounded end of a plunger 67 guided for longitudinal movement in a suitably formed opening in the boss 32 of the casing plate 15, said boss being, for this purpose, somewhat enlarged at its under side. The plunger 67 is normally pressed in the direction to enter one of the notches 66 by a spring 68, and is formed with a rearwardly extending shank 69 adapted to engage a ring 70 suitably secured to the flange 30 of the shaft or hub 31 and surrounding the boss 32. The ring 70 is provided with a notch 71 (Fig. 3) adapted, when the handle 33 is in the angular position to break the circuit, to receive the shank 69 and permit the plunger 67 to move inwardly against the tension of the spring 68. The construction is such that, with the handle 33 in the "off" position, as shown in Fig. 5, the handle 64 may be turned to operate the reversing switch, the inclined face of one or the other of the notches 66 engaging the inclined end of the plunger 67 and forcing the same backwardly, causing the end of the shank 69 to enter the notch 71. The plunger 67 is held in this position, by engagement of the end thereof with the inner face of the segment 65, until the reversing switch has been completely operated, thereby, through engagement of the shank 69 with the notch 71, locking the controller handle 33 against operation. When, however, the reversing handle 64 reaches its opposite extreme position, the other notch 66 is brought opposite the plunger 67, permitting said plunger to move outwardly under the influence of its spring 68, thereby unlocking the controller handle and permitting the same to be moved to close the circuit. Such operation of the handle 33, however, moves the notch 71 out of alinement with the end of the shank 60, so that engagement of the end of said shank with the ring 70 prevents inward movement of the plunger 67, and consequently locks the reversing handle 64 against operation until the controller handle 33 has been returned to the "off" position.

In Fig. 1, three positions of the controller handle or lever 33 are indicated by the characters O, Y, and Δ, respectively. In the present embodiment of the invention, the intermediate position O is the "off" position, or the position in which the circuit is broken; the extreme position Y is the position for connecting the motor in star; and the extreme position Δ is the position for connecting said motor in delta. In moving the controlling lever from the position O, it is desirable that said lever be moved into the position Y before being moved into the position Δ, and that if said lever be moved from the position Y to the position Δ it be moved quickly and without any appreciable dwell in the position O. In order to compel or insure these operations, the following mechanism is provided.

Figure 7:
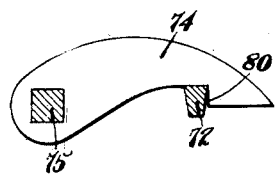
Fig. 7 is a detail section on the line 7—7, Fig. 6.
Figure 6:
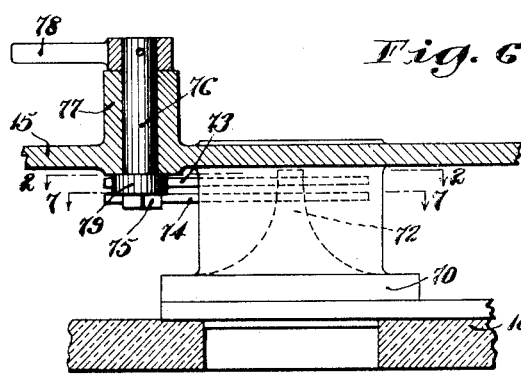
Fig. 6 is a detailed partial section of the mechanism taken on a line corresponding to the line 6—6 of Fig. 2.

The ring 70 is provided with a forwardly extending finger 72 (see Figs. 2, 5, and 6) which is engaged by two latches 73 and 74, respectively. The latch 74 (see also Fig. 7) is secured to the squared inner end 75 of a shaft 76 journaled in a boss 77 on the plate 15 and having secured to its outer end an operating handle 78. The latch 73 is pivotally mounted on a flange or collar 79 formed on or secured to said shaft 76. The latch 74 is provided with a shoulder 80 adapted, when the controller handle or lever 33 is in the position O, to engage the finger 72 and prevent movement of said handle in the direction of the position Y. The latch 73 is provided with a notch 83 having at one side a square shoulder 81 adapted similarly to engage the finger 72 and prevent movement of the controller lever in the direction of the position Δ, but having at the opposite side an inclined shoulder 82 which is engaged by the finger 72 when the controller lever is moved from the position O toward the position Y, thereby lifting said latch.

Both of the latches are so constructed and arranged that the controller lever 33 may be freely moved into the position O from either direction, the latch 73 being lifted by the finger 72 when said lever is so moved, and the latch 74 being similarly lifted when the lever is moved from the direction of the position Y, but offering no obstruction to movement thereof from the direction of the position Δ. When, however, the controller lever reaches the position O, it is locked in this position by the latches 73 and 74, which fall by gravity into operative positions in which the shoulders 80 and 81 engage the finger 72 at opposite sides respectively. In order to release said controller lever, the handle 78 may be operated to raise the latch 74. While the latch 73 will still prevent movement of the controller lever toward the position Δ, lifting of the latch 74 will permit said lever to be moved toward and into the position Y, since engagement of the finger 72 with the inclined surface 82 will raise the latch 73 during this movement. Upon returning the lever 33 from the position Y toward the position O, the finger 72 will engage the end of the latch 73 (and also the end of the latch 74 if the handle 78 has been released), throwing the same upwardly. If this movement be made quickly enough, the latch 73 will be thrown upwardly to a sufficient extent to permit the finger 72 to pass the shoulder 81, thereby permitting movement of the lever 33 into the position Δ.

From the foregoing it will be seen that when the controller lever is moved into the position O it will be automatically locked in this position and cannot be moved in either direction until the handle 78 is intentionally operated to raise the latch 74; that when this is done the lever 33 is still locked by the latch 73 against movement into the position Δ but may be moved into the position Y; and that by a quick movement said lever may thereafter be moved from the position Y to the position Δ. By these means unintentional or improper operation of the controller is effectually prevented.

It will be observed that the coaxial arrangement of the main controller and the reversing switch provides an exceedingly compact construction, the two devices occupying little, if any, more space in the apparatus than the main controller alone, so that the space required for the accommodation of the apparatus in the machine in which it is used is correspondingly reduced.

Figure 9:
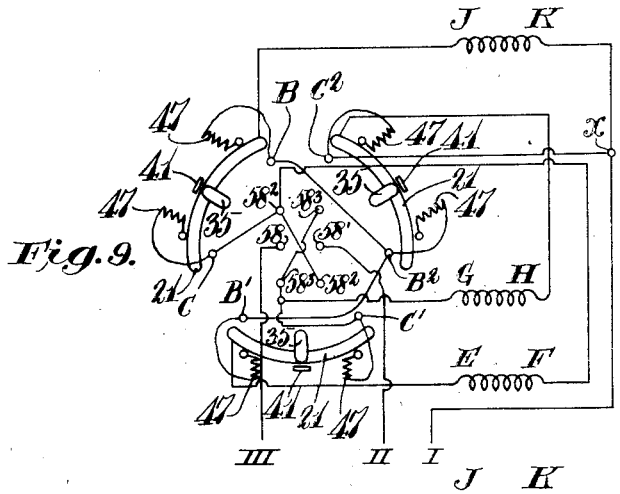
Fig. 9 is a diagrammatic view of the wiring showing the various connections and the controller parts in off position.
Figure 10:
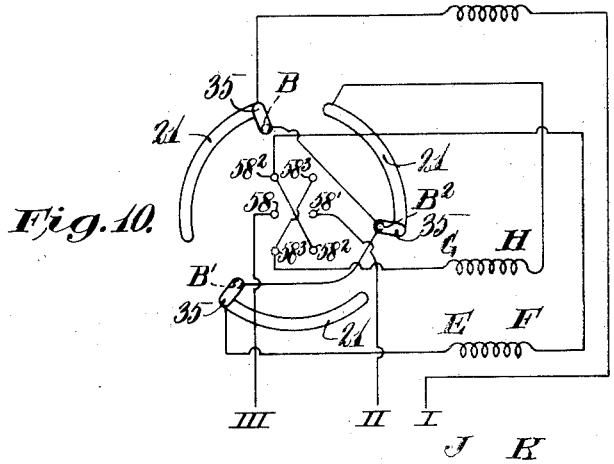
Fig. 10 is a similar wiring diagram with unessential parts omitted, showing the parts in first or star circuit position.
Figure 11:
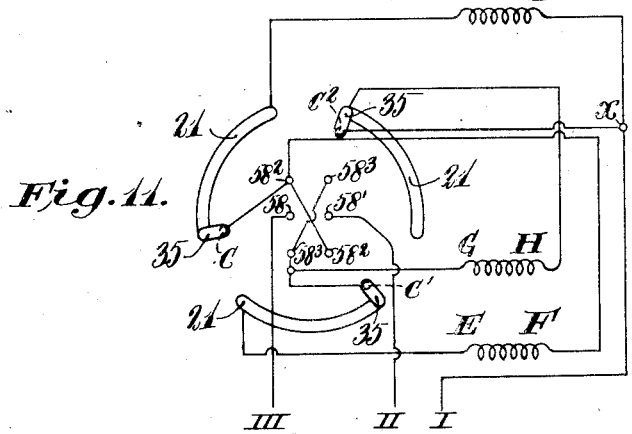
Fig. 11 is a similar view showing the connections when the controller lever is in third or delta circuit position.

Referring now to Figs. 9, 10, and 11, and to Figs. 12 to 15, the applicant's connections may readily be observed. In Fig. 9 the parts are shown in off position. The three mains are designated respectively I, II, and III. The three coils of the motor are respectively JK, GH, and EF. The location of the blow out coils 47 is clearly seen with respect to the various contacts B and C which are herein provided with suitable exponents so as to enable distinguishing between them in tracing the circuits. The same expedient has been adopted in applying suitable exponents to the contact members of the reverse switch which are designated as 58, 58' and 58² and 58³. For purposes of illustration a conventional diagram has been provided illustrating the reverse switch, but it will be understood that in the construction illustrated in Fig. 4, two of the mains are connected to diametrically opposite contact members 58 and the connections to two of the motor coils lead off from the other diametrically opposite pair. In the present case the two mains designated respectively II and III are connected to the contacts 58' and 58, while the coils GH and EF of the motor are adapted to have their connections with mains II and III reversed by means of the reversing switch, these coils being connected respectively to the contacts 58³ and 58².

Figure 12:
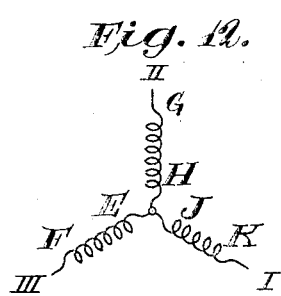
Figs. 12 and 13 are star diagrams showing the effect of operation of the reverse switch.
Figure 13:
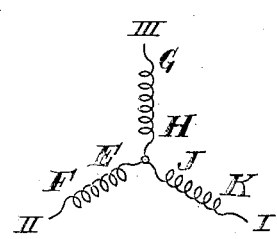
Figure 14:
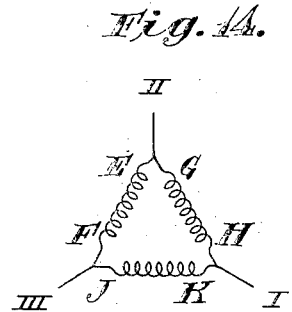
Figs. 14 and 15 are delta diagrams showing the result of the different positions of the reverse switch.

Observing particularly Figs. 12 and 14 which show the connections in conventional form, and to Fig. 10, it will be noted that in Fig. 10 where the connection is of the star type, main I connects through coil KJ through contacts B, B², B', coil EF, reverse switch poles 58² and 58 to main III, when the reverse switch is disposed in such position as to connect poles 58 and 58² and poles 58' and 58³. Main II is connected by way of reverse switch contacts 58' and 58³ to coil GH, to contact B², thereby completing the star.

Referring now to Fig. 11 and noting that the connecting members 35 have been moved to make contact between the contact points C, C' and C², instead of, as in Fig. 10, B, B', and B², and the members 21, it will be noted that main I has a branched connection at the point marked X, and tracing the upper lead, connects through coil KJ, member 21, member 35, contact element C, the poles 58² and 58 of the reversing switch to main III. Main II is connected by way of reverse switch poles 58' and 58³ through coil GH, by way of contact C² to main I. Main III is connected by way of reverse switch poles 58 and 58², by way of coil FE through contact C', reverse switch poles 58³, and 58' to main II, thereby completing the delta connection. It is accordingly obvious that by shifting the controller from first to second position, the change from star to delta connection is readily made and thereby the motor changed from starting to running connection.

Considering now Figs. 10 and 11 and Figs. 13 and 15, it will be readily seen that by the swinging of the contact members of the reverse switch in such manner as to change the connection from poles 58 to 58² and poles 58' to 58³ so that the connection will then be 58, 58³, and 58' to 58², the connection between mains II and III is reversed as respects coils GH and EF.

From the foregoing description it will be obvious that I have provided a simple and improved apparatus for reversing the connections between two mains and the terminals of the motor, thereby reversing the motor, and also means for changing the motor connections from star to delta, with improved interlocking means so constructed as to prevent operation of the reverse mechanism when said motor is running and to necessitate rapid movement of the controller handle in passing from star to delta connection.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In an apparatus of the character described, in combination, a casing, contact members therein, a brush cooperating with said contact members, a hollow shaft by which said brush is carried, said shaft being journaled in the wall of said casing, an operating handle carried by said shaft at the exterior of said casing, and a reversing switch comprising contact members within said casing, a disk cooperating with said contact members and loosely and rotatably mounted within said casing, a shaft arranged concentric with said first named shaft and journaled within the same, an operating handle carried by said last named shaft at the exterior of said casing, means for loosely connecting said last named shaft and disk for rotation in unison, and a spring interposed between said last named shaft and disk for pressing the latter into engagement with its cooperating contact members.

2. Controlling mechanism comprising a circuit controller movable in different directions to effect different connections, and means for controlling the movement of said circuit controller including means necessitating movement from said neutral position in one of said directions prior to movement in the other direction, said movement controlling means also including means cooperating with said second mentioned means in locking said controller in said neutral position, said second and third mentioned means each preventing movement of said circuit controller from its neutral position in a single direction only.

3. Controlling mechanism comprising a rotatable circuit controller movable in different directions to effect different connections, and means for controlling the movement of said circuit controller including means necessitating movement from said neutral position in one of said directions prior to movement in the other direction, said movement controlling means also including means cooperating with said second mentioned means in locking said controller in said neutral position, said second and third mentioned means each preventing movement of said circuit controller from its neutral position in a single direction only.

4. In an apparatus of the character described, the combination with a circuit controller, of means for automatically locking said controller in a neutral position, said means comprising a pair of substantially identical latches each adapted to lock said controller against movement in one direction only.

5. In an apparatus of the character described, the combination with a circuit controller having a plurality of operative positions and a handle which is reversely operated to obtain said positions, of means for automatically locking said controller in a neutral position to break the circuit when moved into said neutral position, said means comprising a pair of latches each adapted to lock said controller against movement in one direction only, and manually operated means for releasing said locking means.

6. In an apparatus of the character described, the combination with a circuit controller having a plurality of operating positions and a handle which is reversely operated to obtain said positions, of means for automatically locking said controller in a neutral position to break the circuit when moved into said latter position, said means comprising a pair of latches each adapted to lock said controller against movement in one direction only, and manually operated means for releasing one of said latches.

7. In an apparatus of the character described, the combination with an arcuately swingable circuit controller controlling a plurality of different connections, of automatically acting latch means for locking said controller in "off" position when moved into such position and requiring said controller to move in opposite directions in a predetermined sequence, and a plurality of handles swingable in planes parallel to the same plane, one for releasing said controller and the other for actuating the same.

8. In an apparatus of the character described, the combination with a circuit controller handle movable from an intermediate circuit breaking position into either of two circuit closing positions at opposite sides thereof to produce different circuit connections, of a pair of latches adapted respectively to lock said controller handle against movement in opposite directions from said circuit breaking position, and manually operated means for releasing one of said latches to permit movement of said controller handle into one of said circuit closing positions, the other of said latches being provided with means whereby it may be automatically released by movement of said controller handle.

9. In an apparatus of the character described, the combination with a circuit controller handle movable from an intermediate circuit breaking position into either of two circuit closing positions at opposite sides thereof to produce different circuit connections, of a pair of automatically acting latches for locking said controller handle in said circuit breaking position when moved thereinto and each adapted to lock said controller handle against movement in one direction only from said circuit breaking position, and a handle for releasing one of said latches to permit movement of said controller handle into one of said circuit closing positions, the other of said latches being provided with means whereby it may be automatically released by movement of said controller handle.

10. In an apparatus of the character described, the combination with a circuit controller movable from an intermediate circuit breaking position into either of two circuit closing positions at opposite sides thereof to produce different circuit connections, said circuit controller having a locking projection, of a pair of latches adapted to engage said projection at opposite sides respectively to lock said controller against movement in either direction from said circuit breaking position, a shaft to which one of said latches is secured, said shaft having a handle whereby said last mentioned latch may be released to permit movement of said controller into one of said circuit closing positions, the other of said latches being loosely pivoted on said shaft, and means operative automatically by movement of said controller from said last named circuit closing position toward the other of said circuit closing positions to render inoperative said last mentioned latch.

11. In an apparatus of the character described, the combination with a circuit controller movable into either of two extreme circuit closing positions or into an intermediate circuit breaking position, of means comprising a pair of latches moving in parallel planes for automatically locking said controller in said circuit breaking position when moved thereinto and for preventing movement of said controller from one of said extreme positions to the other through said intermediate position except by quick movement.

12. In an apparatus of the character described, the combination with a circuit controller movable into either of two extreme positions or into an intermediate position, of a pivoted latch member provided with means to prevent a slow movement of said controller from one of said extreme positions to the other through said intermediate position, but permitting a quick movement thereof, together with manually controlled means pivotable on an axis parallel to a line parallel to the axis of pivotal movement of said latch for releasably locking said controller against movement to the first of said extreme positions.

13. In an apparatus of the character described, the combination with a rotatable circuit controller movable into either of two extreme circuit closing positions or into an intermediate circuit breaking position, of a pair of latches each pivoted on an axis parallel to the axis of said rotatable circuit controller adapted for automatically locking said controller against movement in one direction only from said circuit breaking position after the latter has been moved thereinto, a handle for releasing one of said latches, and means whereby the other of said latches may be rendered inoperative to effect its locking function by quick movement of said controller from one of said extreme positions to the other.

14. In an apparatus of the character described, the combination with a circuit controller movable from an intermediate circuit breaking position into either of two extreme circuit closing positions at opposite sides thereof to produce different circuit closing connections, of a pair of latches each of which is adapted to lock said controller against movement in one direction only from said intermediate position, manually operated means for releasing one of said latches to permit movement of said controller into one of said extreme positions, and means for automatically preventing the other of said latches from locking upon a quick movement of said controller from said last named extreme position to the other.

15. A controlling device comprising a circuit controller movable in a plurality of directions from a normal position, means whereby the change from one direction of movement to another must be made quickly by passing through said normal position, means for locking said controller in said normal position, and manual means for releasing said controller to allow initial operation of the same, said controller being independent during its further movements of said manual means.

16. A controlling device comprising a circuit controller movable in a plurality of directions from a certain position, means whereby the change from one direction of movement to another must be made quickly by passing through said position, means cooperating with said first mentioned means to form a notch, and means movable with said controller adapted to rest in the notch so formed to lock said controller, and manual means for moving said cooperating notch forming means to allow initial operation of the controller.

17. A controller device comprising a controller arm adapted to have a plurality of different positions including an "off" position and a circuit closing position at each side of said first mentioned position, and means for locking said arm in said off position and for necessitating quick movement of said arm from one of said circuit closing positions to the other, said means including means forming a notch having relatively movable abutment surfaces at its opposite ends and a member carried by said controller adapted to be disposed within said notch for holding the same in a locked position.

18. A controller device comprising a controller arm adapted to have a plurality of different positions including an "off" position and a circuit closing position at each side of said first mentioned position, means for locking said arm in said off position and for necessitating quick movement of said arm from one of said positions to the other, said means including means forming a notch and having relatively movable abutment surfaces at its opposite ends and a member carried by said controller adapted to be disposed within said notch for locking the same, and manual means for terminating the locking operation of said means.

19. A controller device comprising a controller arm movable in a plurality of directions from a neutral position, means whereby the change from one direction of movement to another must be made quickly by passing through said neutral position, said means comprising portions forming a notch, and means cooperating with said notch forming portions to lock said controller in said neutral position.

20. A controller device comprising a controller arm having extreme operative positions and a neutral position therebetween, and means for locking said arm in said neutral position and for necessitating the change from one of said extreme positions to the other being made quickly by passing through said neutral position including a plurality of pivotal latches forming the opposite sides of a locking notch.

21. A controlling device comprising a controller arm having extreme operative positions and a neutral position, and means for locking said arm in said neutral position and necessitating the change from one of said extreme positions to the other being made quickly by passing through said neutral position, said means comprising a plurality of movable members each having means forming one side of opposed surfaces of a notch, and means movable with said controller arm disposed within said notch when in neutral position, one of said movable members being manually moved in order to allow operation of said arm and the other automatically moved on operation of said arm.

22. A controller comprising a rotatable actuating shaft carrying a radially extending plate and having cooperating longitudinally movable contacts carried thereby and extending therethrough to opposite sides thereof, a plate disposed on each side of said other plate and carrying contacts cooperating with said other contacts, and means whereby said shaft must be operated in a predetermined order including means extending through one of said plates and means engaging said latter means on the other side of said plate.

23. A controller device comprising a face plate, a plurality of spaced contact carrying plates carried thereby, an actuating shaft journaled in said face plate and carrying a contact plate disposed between said other contact plates, a second shaft extending through said first mentioned shaft and a contact plate operatively connected thereto, and means reciprocably mounted within said face plate for locking said latter contact plate in either one of a plurality of positions and controlled by said contact plate disposed between said plurality of plates.

In testimony whereof I affix my signature.

CHARLES W. WYMAN.